United States Patent [19]
Rutland, Jr.

[11] Patent Number: 5,722,316
[45] Date of Patent: Mar. 3, 1998

[54] CARRIER FOR ALUMINUM FOOD PANS

[76] Inventor: Matthew Rutland, Jr., 18485 Robson, Detroit, Mich. 48235

[21] Appl. No.: 745,693

[22] Filed: Nov. 12, 1996

[51] Int. Cl.⁶ .......................... B65D 90/04; B65D 90/12
[52] U.S. Cl. .................. 99/426; 99/449; 294/27.1; 294/32
[58] Field of Search ................... 99/426, 449, 448; 294/27.1, 32; 220/737

[56] References Cited

U.S. PATENT DOCUMENTS

| | | | |
|---|---|---|---|
| 1,773,518 | 8/1930 | Coe | 99/426 X |
| 1,781,635 | 11/1930 | Fischacher | 294/32 |
| 2,973,218 | 2/1961 | Schaum | 99/426 X |
| 4,852,760 | 8/1989 | Sarnoff et al. | 294/32 X |

FOREIGN PATENT DOCUMENTS 732950  4/1966  Canada ................ 294/32

Primary Examiner—Reginald L. Alexander
Attorney, Agent, or Firm—Barnes, Kisselle, Raisch, Choate, Whittemore & Hulbert P.C.

[57] ABSTRACT

A carrier for shallow downwardly dished flexible aluminum food pans. The carrier is generally channel-shaped, having a bottom wall and side walls extending upwardly from the opposite side edges of the bottom wall. Flanges extend laterally inwardly from the upper edge portions of the side walls and are adapted to engage over the side margins of the pan. The carrier is supported by at least two carrying straps each having its ends secured to the flanges. The carrier is open at both ends so that it may support food pans of varying lengths.

7 Claims, 1 Drawing Sheet

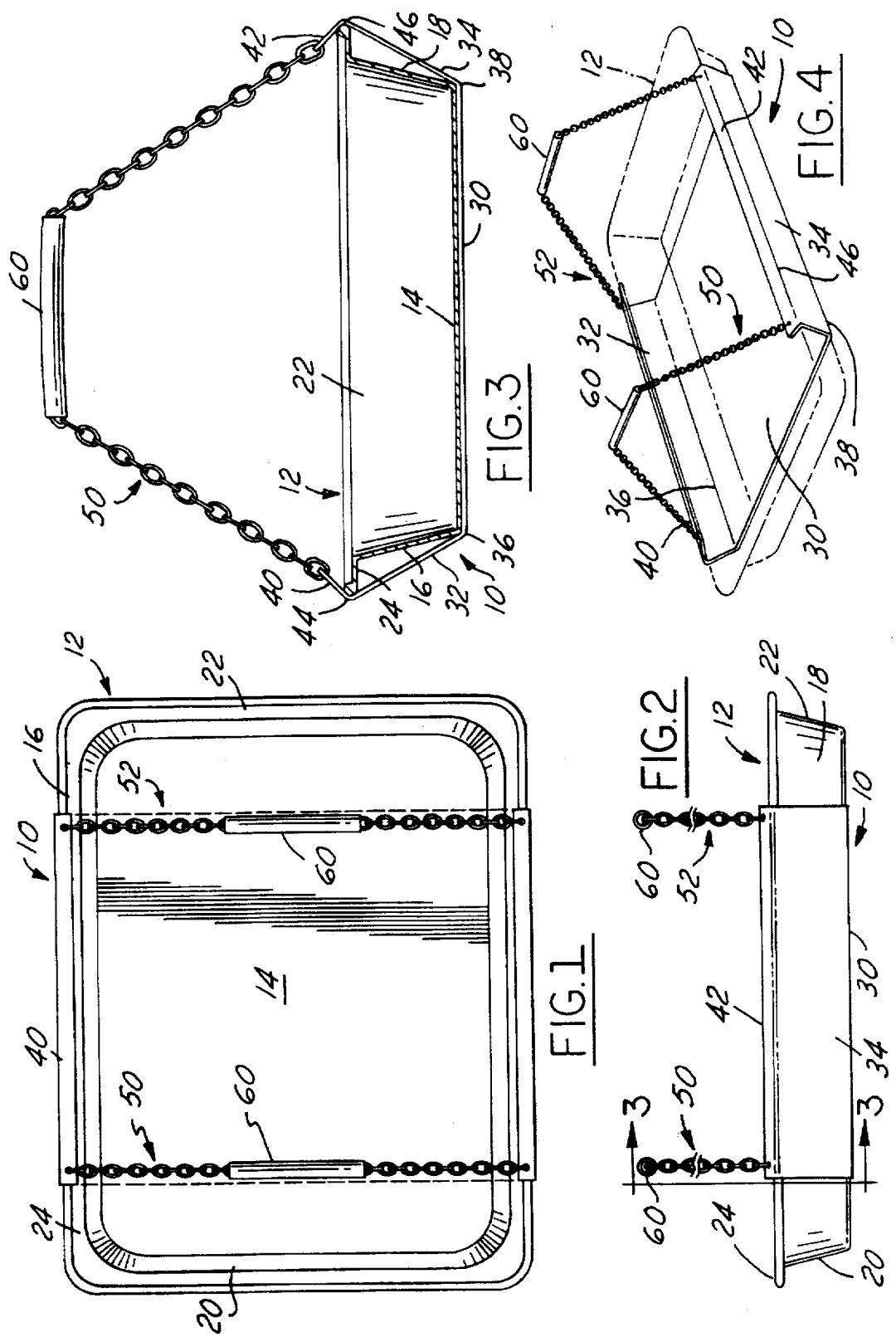

CARRIER FOR ALUMINUM FOOD PANS

FIELD OF INVENTION

This invention relates to a carrier for aluminum food pans.

BACKGROUND AND SUMMARY

Food pans are used to carry hot, heavy items of food, such, for example, as a turkey or lasagna, from the oven to the table, to picnics, up and down stairs, to barbecues, or catering functions. The food pans are made of very thin, flexible sheet metal, such as aluminum, and typically a person will carry the pan by gripping the edges. Often the pans will bend or fold, spilling the contents.

In accordance with the present invention, a carrier is provided for the food pans. The carrier is generally channel-shaped, comprising a bottom wall and side walls extending upwardly from the side edges of the bottom wall. At least two carrying straps are provided, each having its ends secured to the side walls. The carrier is open at the front and rear so that it may be used to carry food pans of various lengths.

The carriers preferably have flanges extending laterally inwardly from the upper edge portions of the side walls. The flanges are adapted to engage over the upper edges of the pan, to stabilize the pan and prevent it from slipping. The ends of the straps are preferably secured to these flanges.

The carrier is preferably made of a single piece of sheet material with bend lines along the side edges of the bottom wall forming integral connections with the side walls, and bend lines along the upper edge portions of the side walls forming integral connections with the flanges.

One object of this invention is to provide a carrier for food pans having the foregoing features and capabilities.

Another object is to provide a carrier for food pans which is composed of a few simple parts, is rugged and durable in use, and is capable of being quickly and easily manufactured and assembled.

These and other objects, features and advantages of the invention will become more apparent as the following description proceeds, especially when considered with the accompanying drawings and claims.

BRIEF DESCRIPTION OF THE DRAWINGS

FIG. 1 is a top plan view showing a carrier constructed in accordance with this invention supporting a food pan.

FIG. 2 shows the carrier and food pan as viewed from the side.

FIG. 3 is a sectional view taken on the line 3—3 in FIG. 2.

FIG. 4 is a perspective view of the carrier showing the food pan in broken lines.

DETAILED DESCRIPTION OF THE PREFERRED EMBODIMENT

Referring now more particularly to the drawings, the carrier 10 is shown supporting a food pan 12.

The food pan 12 is shallow and downwardly dished, being made of a single piece of very thin flexible sheet material such as aluminum. The pan 12 has a rectangular bottom wall 14, rectangular side walls 16 and 18 and rectangular end walls 20 and 22 extending upwardly from the side and end edges of the bottom wall. Typically, the side and end walls 16–22 flare outwardly, as shown. A continuous annular flange 24 extends horizontally outwardly from the upper edges of the side and end walls.

The carrier 10 is generally channel-shaped, having a bottom wall 30 and side walls 32 and 34 extending upwardly from the side edges 36 and 38 of the bottom wall. The carrier has no end walls and therefore is open at both the front and the rear. The width of the bottom wall of the carrier 10 approximates the width of the bottom wall of the pan 12.

Flanges 40 and 42 extend laterally inwardly from the upper edge portions of the side walls 32 and 34. The flanges are adapted to engage over the outer edges of the portions of the flange 24 along the side walls 16 and 18 of the pan when the pan is supported on the bottom wall of the carrier. When the bottom wall of the carrier is horizontal, the flanges incline inwardly and upwardly so that they will more readily engage over the outer edges of the flange 24.

The carrier is made of a single piece of sheet material, preferably a strong metal. The sheet metal may be aluminum, but of sufficiently thicker gage than the pan 12 such that it is strong enough not to bend appreciably when carrying a load. Arcuate bends along the side edges 36 and 38 of the bottom wall form integral connections with the side walls. Arcuate bends 44 and 46 along the upper edge portions of the side walls form integral connections with the flanges 40 and 42. The bottom wall 30 and the side walls 32 and 34 are flat and rectangular, and the side walls flare away from each other at approximately the same angle as the side walls of the pan.

Two carrying straps 50 and 52 are provided, enabling a person to hand carry the carrier. Each strap comprises a flexible linear member, in this instance, a link chain, having its opposite ends secured to the flanges 40 and 42. One strap is connected to the flanges near one end of the carrier and the other strap is connected to the flanges near the opposite end of the carrier. Preferably, a hand grip tube 60 of plastic or like flexible material is sleeved on each strap near the midpoint in its length so that the straps may be held more comfortably. The straps are long enough that the midportions may be brought together and gripped in one hand.

In use, the food pan 12 is supported by the carrier 10 in the manner shown with its opposite side walls 16 and 18 extending upwardly along the side walls 32 and 34 of the carrier. The flanges 40 and 42 of the carrier engage over the side margins of the pan 7 more specifically over the outer edges of the flange 24 along the side walls of the pan, to provide stability and prevent the pan from slipping or moving relative to the carrier. The pan 12 may be of any length because the ends of the carrier are open.

Heavy food items may be supported in the pan 12 and moved from place to place by the carrier 10 without risk of the food pan folding or buckling.

I claim:

1. A carrier for shallow, downwardly dished, flexible aluminum food pans, said carrier being generally channel-shaped and comprising:
a bottom wall having opposite side edges,
side walls extending upwardly from the respective side edges of said bottom at least two carrying straps each having ends secured to the respective side walls,
said carrier being open at the front and rear,
wherein said side walls have upper edge portions and flanges extending laterally inwardly from said upper edge portions adapted to engage over the side margins of the pan, the ends of said straps being secured to said flanges at longitudinally spaced points.

2. A carrier as defined in claim 1, wherein said carrier, including its bottom wall, side walls and flanges, is made of a single piece of sheet material with arcuate bends along the side edges of the bottom wall forming integral connections with said side walls and arcuate bends along said upper edge portions of the side walls forming integral connections with said flanges, the bottom wall and the side walls are flat and rectangular, and the side walls flare away from each other.

3. A carrier as defined in claim 2, wherein said flanges incline inwardly and upwardly to facilitate engagement over the side margins of the pan.

4. A carrier as defined in claim 3, whereto said sheet material is metal.

5. A carrier as defined in claim 4, wherein said straps are flexible link chains.

6. A carrier for shallow, downwardly dished, flexible aluminum food pans, said carrier being generally channel-shaped and comprising:

a bottom wall having opposite side edges, side walls extending upwardly from the respective side edges of said bottom wall, at least two carrying straps each having ends secured to the respective side walls, said carrier being open at the from and rear, said carrier, including its bottom wall and side walls being made of a single piece of sheet material with bends along the side edges of the bottom wall forming integral connections with said side walls, and the bottom wall and the side walls being flat and rectangular.

7. A carrier as defined in claim 6, wherein said side walls have upper edge portions and flanges extending laterally inwardly from said upper edge portions adapted to engage over the side margins of the pan, the ends of said straps being secured to said flanges at longitudinally spaced points.

* * * * *

UNITED STATES PATENT AND TRADEMARK OFFICE
CERTIFICATE OF CORRECTION

PATENT NO.   : 5,722,316
DATED        : March 3, 1998
INVENTOR(S)  : Matthew Rutland, Jr.

It is certified that error appears in the above-indentified patent and that said Letters Patent is hereby corrected as shown below:

Column 2, line 60, after "bottom" insert --wall, and--

Column 3, line 12, change "whereto" to --wherein--

Column 4, line 5, change "from" to -front--

Signed and Sealed this

Thirtieth Day of June, 1998

*Attest:*

BRUCE LEHMAN

*Attesting Officer*   Commissioner of Patents and Trademarks